(12) United States Patent
Hemingway

(10) Patent No.: US 6,464,945 B1
(45) Date of Patent: *Oct. 15, 2002

(54) NON-THERMAL PLASMA EXHAUST NOX REACTOR

(75) Inventor: Mark David Hemingway, Columbiaville, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/465,073

(22) Filed: Dec. 16, 1999

Related U.S. Application Data

(63) Continuation-in-part of application No. 09/268,496, filed on Mar. 11, 1999.

(51) Int. Cl.$^7$ .......................... B01D 53/56; F01N 3/28
(52) U.S. Cl. ............... 422/174; 422/180; 422/186.04; 422/186; 60/275
(58) Field of Search .................. 422/174, 186, 422/186.04, 180; 60/275, 300

(56) References Cited

U.S. PATENT DOCUMENTS

| | | | | |
|---|---|---|---|---|
| 4,152,603 A | * | 5/1979 | Imris ..................... | 422/186.16 |
| 4,842,829 A | * | 6/1989 | Hirai et al. ............ | 422/186.08 |
| 5,236,672 A | * | 8/1993 | Nunez et al. .......... | 422/186.04 |
| 5,942,195 A | * | 8/1999 | Lecea et al. ........... | 422/174 |
| 6,130,182 A | * | 10/2000 | Naeem ................. | 422/174 |

* cited by examiner

Primary Examiner—Hien Tran
(74) Attorney, Agent, or Firm—Vincent A. Cichosz

(57) ABSTRACT

An NOx reducing exhaust treatment system includes a non-thermal plasma reactor assembly which initiates NOx reduction reactions that are completed by a catalytic converter downstream of the reactor in the system. The reactor assembly includes a monolithic reactor element formed of insulating plates and spacers made of high dielectric material, such as alumina. Some of the plates carry electrodes and connecting conductors which may be painted on with conductive ink and baked on as a surface coating. The electrodes are patterned to provide a distance between the electrodes and the connectors of alternate electrodes that is sufficient to prevent arc over. The plates and spacers form a plurality of thin gas passages each lying between a pair of electrodes, one to be charged with an AC voltage and the other grounded to impress the alternating voltage across each passage. The electrodes are insulated from the passages by the thin insulating plates forming the passages so that no current flows between the electrodes. Instead, the voltage creates a non-thermal plasma in the passages that increases the activity of electrons in the exhaust gases and initiates breakdown of the NOx and other reaction products in the gases. The reactions are then completed in a downstream catalytic converter, resulting in reduced emissions of NOx as well as other controlled emissions in the treated exhaust gases.

12 Claims, 5 Drawing Sheets

NON-THERMAL PLASMA EXHAUST NOX REACTOR

CROSS-REFERENCE TO RELATED APPLICATIONS

The present application is a continuation-in-part of U.S. patent application Ser. No. 09/268,496 filed Mar. 11, 1999 for "Non-thermal Plasma Exhaust NOx Reactor," which is hereby incorporated by reference herein in its entirety.

TECHNICAL FIELD

This invention relates to reactors for chemical reduction of nitrogen oxide (NOx) emissions in the exhaust gases of automotive engines, particularly diesel and other engines operating with lean air fuel mixtures that produce relatively high emission of NOx. More particularly, the invention pertains to an improved non-thermal plasma reactor and system for use with diesel engines and the like.

BACKGROUND OF THE INVENTION

In recent years, non-thermal plasma generated in a packed bed reactor has been shown to be effective in reducing nitric oxides (NOx) produced by power plants and standby generators. These units usually have a reducing agent, such as urea, to enhance the conversion efficiency. The packed bed reactor consists essentially of a high voltage center electrode inserted into a cylinder of dielectric material, usually a form of glass or quartz.

An outside or ground electrode is formed by a coating of metal in various forms, including tape, flame spray, mesh, etc. The space between the center electrode and the inside diameter of the dielectric tube is filled or packed with small diameter glass beads. When high voltage alternating current is applied to the center electrode, the surfaces of the beads go into corona, producing a highly reactive and selective surface for inducing the desired reaction in the gas.

Unfortunately, the packed bed design with its loose beads and glass dielectric is impractical for use in the conditions found in a mobile emitter, such as a car or truck. The vibration and wide temperature swings of the vehicle system would damage the packed bed and the necessary temperature and vibration isolation needed to make it survive would not be cost effective.

A reactor for use with diesel engines and other engines operating with lean air fuel mixtures is disclosed in commonly assigned U.S. patent application Ser. No. 09/268,496 entitled "Non-thermal Plasma Exhaust NOx Reactor." Disclosed therein is a reactor element comprising high dielectric, nonporous, high temperature insulating means defining a group of relatively thin stacked cells forming gas passages and separated by the insulating means. Alternate ground and charge carrying electrodes in the insulating means on opposite sides of the cells are disposed close to, but electrically insulated from, the cells by the insulating means. The electrodes may be silver or platinum material coated onto alumina plates. Conductive ink is sandwiched between two thin nonporous alumina plates or other suitable insulating plates to prevent arcing while providing a stable electrode spacing for a uniform electric field There remains a need in the art to minimize the potential failure condition whereby high voltage could leak away from the reactor due to the short distance between the electrode and the connector. There further remains a need for an improved reactor that can offer the structural integrity of current automotive catalysts while providing improved high voltage control.

SUMMARY OF THE INVENTION

The present invention provides a monolithic non-thermal plasma reactor (MPR) in which the electrodes may be silver or platinum material coated onto alumina in a pattern that establishes a separation between the electrodes and the connectors of alternate electrodes suitable to prevent voltage leakage. Conductive ink is sandwiched between two thin nonporous alumina plates or other suitable insulating plates. This prevents arcing while providing stable electrode spacing needed for a uniform electric field.

Opposite polarity plates are retained by a dielectric structure, such as a honeycomb extrudate common in today's automotive catalytic converters. The extrudate may be coated or can be made of a catalytic material whose structure and chemical composition provide active sites for NOx reduction. Alternatively, a downstream catalytic converter may be provided in the system to complete the conversion of NOx to nitrogen and oxygen. The use of the catalyst significantly reduces the power required to complete the conversion of NOx.

In the MPR, each of the parallel plate pairs forms a cell. These cells are stacked in order to subject the exhaust gases to as much catalyst surface in plasma as is possible within a minimal volume. By reducing the electrode spacing of the cells, lower voltages can be used to create a corona. This minimizes the extraordinary safeguards and barriers needed to contain very high (15,000 plus) voltages of the packed bed reactors, proving a simpler and lower cost electrical delivery system.

The use of electrode coated plates may be made by the use of ceramic inks and printing processes which provides the simplicity of making connections and conductors through conventional screening processes. This eliminates the need for wires and connectors and their associated assembly complexity and unreliability.

These and other features and advantages of the invention will be more fully understood from the following description of certain specific embodiments of the invention taken together with the accompanying drawings.

DESCRIPTION OF THE PREFERRED EMBODIMENT

Figure 1:
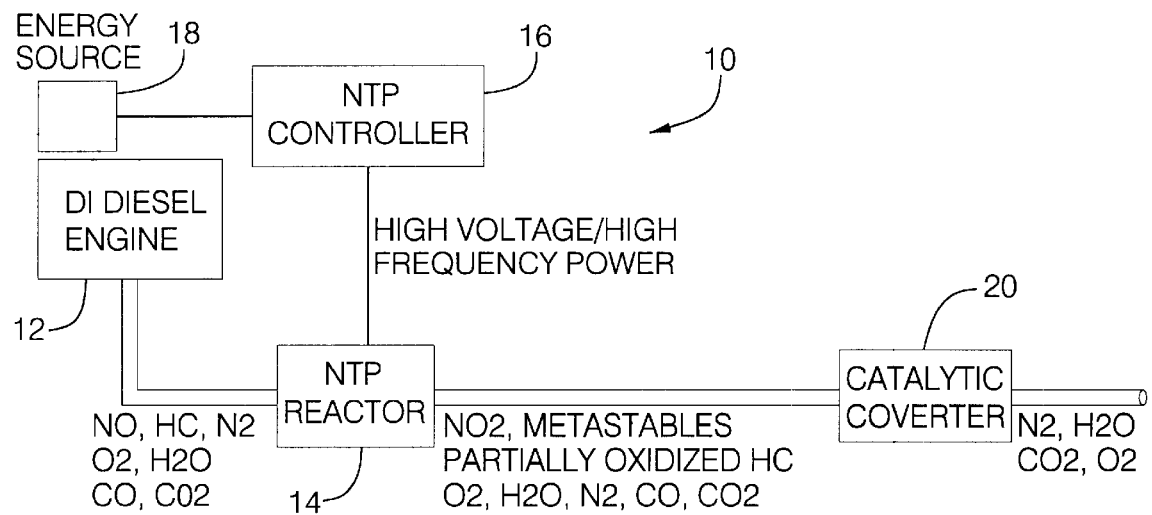
FIG. 1 is a schematic diagram showing a non-thermal plasma (NTP) system including a non-thermal plasma reactor of the invention for the conversion of NOx in an automotive vehicle.

Referring first to FIG. 1 of the drawings in detail, numeral 10 generally indicates an exhaust treatment system for an automotive vehicle having a direct injection diesel engine 12, or another engine operating with lean combustion, and including a non-thermal plasma reactor 14 formed in accordance with the invention.

Reactor 14 is connected with a controller 16 that is supplied with electrical energy from a source 18 and provides high voltage, high frequency AC power to the reactor 14. The diesel engine exhaust carries emissions of nitrogen oxides, hydrocarbons, nitrogen, oxygen, water, carbon monoxide, and carbon dioxide to the reactor 14. A non-thermal plasma developed in the reactor by the applied AC voltage converts the emissions to nitrogen dioxide, metastables, partially oxidized hydrocarbons, oxygen, water, nitrogen, carbon monoxide, and carbon dioxide from the reactor. These emissions are passed to a catalytic converter 20, which completes the partial reactions to result primarily in nitrogen, water, carbon dioxide and oxygen. Conversion of the nitrogen oxides, in the diesel engine exhaust, depends greatly on the efficiency of the reaction in the NTP reactor 14, which is constructed in accordance with the teachings of the present invention.

Figure 3:
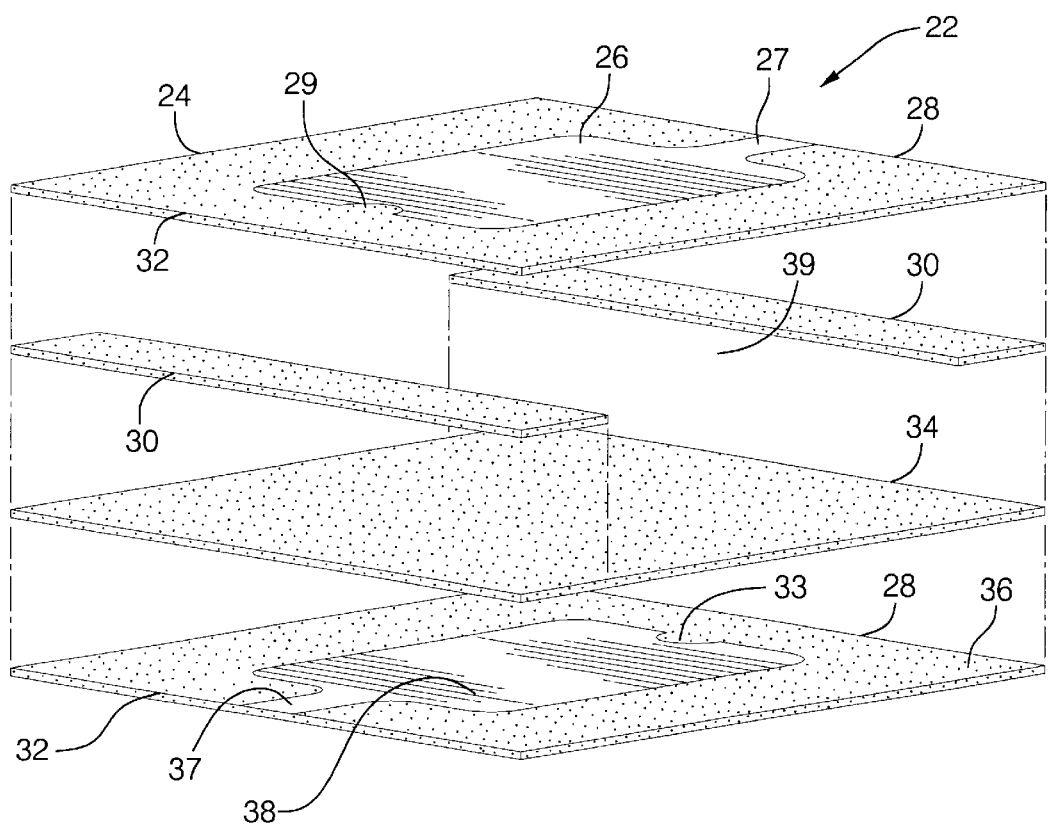
FIG. 3 is an exploded pictorial view showing the construction of a single cell of an experimental NTP reactor.

Referring now to FIG. 3, there is shown in exploded form a single cell 22 of an experimental form of a NTP reactor element which was successfully tested, demonstrating a conversion efficiency for NOx in excess of fifty percent. Cell 22 includes a first alumina plate 24 having printed on one side thereof a generally rectangular silver electrode 26 having a portion defining an inwardly curved hollow 29 and having a narrow connector 27 extending to one edge 28 of the insulating alumina plate 24. Hollow 29 spaces the electrode 26 at a distance from connector 37 suitable to prevent arc over.

Below the alumina plate 24 on the unprinted side thereof, a pair of alumina spacers 30 engage the plate 24. One spacer extends along the right edge 28 of the plate, and the other spacer 30. extends along an opposite left edge 32 of the plate 24. The lower sides of the spacers 30 are engaged by a plain alumina plate 34 which is, in turn, engaged on its opposite lower side by a printed plate 36 having printed on its upper surface a connector 37 to an electrode 38 of silver or the like having a portion defining a curved hollow 33. The narrow connector 37 connects the electrode 38 with the edge 32 of the lower plate that is opposite to the edge 28 to which the electrode 26 of the plate 24 is connected. The corners of electrodes 26, 38 are rounded to avoid creating focal points of voltage field lines that could concentrate energy and break down the insulation so that current could pass therethrough.

In assembly, each cell 22 is formed from the stack of plates 24, 34, and 36, and spacers 30 between plates 24 and 34 provide a passage 39 through the cell between the spacers 30. having a height equal to the thickness of the spacers 30 which, in the experimental embodiment shown, is about 1.5 mm.

In operation of the cell in a stack of similar cells, exhaust gas is passed through the passage 39 between the spacers 30, while a high voltage alternating current is applied to the electrode 26. Electrode 38 of the lower plate is grounded, so that an alternating voltage is applied between the electrodes 26, 38 and is imposed upon the exhaust gas passing through the passage in the cell. The passage 39 is insulated from both electrodes by the high dielectric alumina plates. Plate 24 separates the charged electrode 36 from the passage 39 that is on the other, noncoated, side of plate 34. Electrode 38 is insulated from the passage 39 by the uncoated plate or plain alumina plate 34 that is stacked between the coated electrode 38 and the passage 39. This insulation prevents any flow of electricity between the electrodes 26, 38 and thus prevents an actual arc from passing, between the electrodes, Thus, there is no current flow and the exhaust gas is not heated by the plasma reaction within the passage. However, the alternating voltage impressed upon the passage does provide electric energy which increases the activity of electrons in the exhaust gas within the passage and thus initiates the chemical reactions which begin the reduction of NO to nitrogen and oxygen. The electrodes 26 and 38 arc extended through connectors 27, 37 to opposite edges 28, 32 of their respective plates where they may be electrically contacted by a conductor, for example, to charge electrode 26 with a high AC voltage and to ground electrode 38, as is required for operation of the reactor cell. The connectors are made narrow to minimize power loss from the useless formation of plasma outside of the passages 39 and to reduce the precious metal content of the plates.

Figures 2A, 2B:
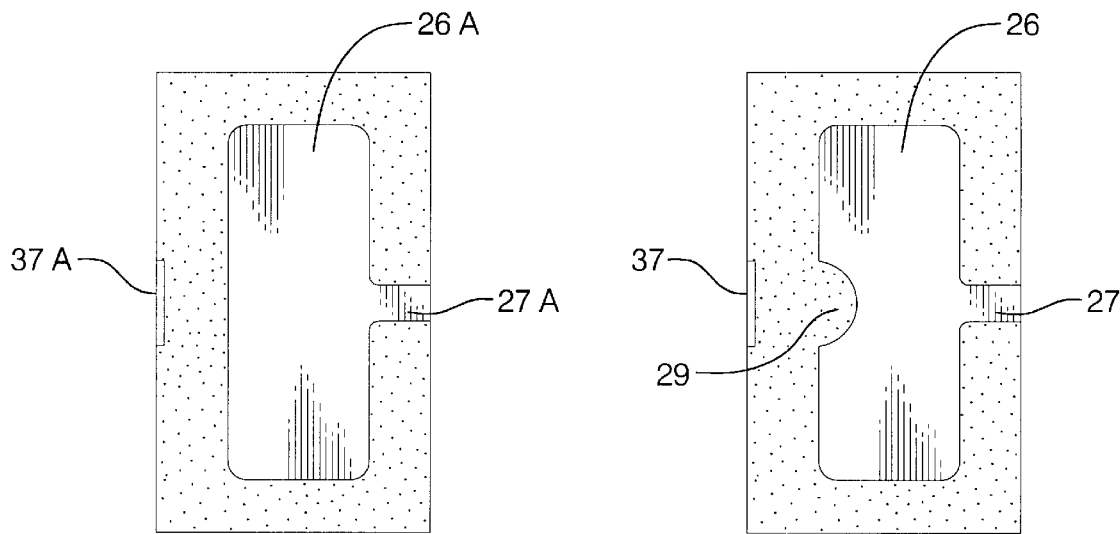
FIG. 2A is a plan view of a single alumina plate showing an electrode coated in accordance with prior electrode design and FIG. 2B is a plan view of a single alumina plate showing an electrode in accordance with a preferred embodiment of the present invention.

When too short a distance is provided between the electrodes and the connectors, a potential failure condition is presented where high voltage could leak away from the reactor. The present electrodes are patterned having a portion defining an inwardly curved hollow 29 so as to provide a distance between the connector 37 and the electrode 26 sufficient to prevent arc over without diminishing performance. FICS. 2A and 2B provide a view of an electrode 26a having connectors 27A and 37A in accordance with a previous design and electrode 26 of the present embodiment. As shown in FIG. 2B, the present invention provides the advantage of increased spacing between electrode 26 and connector 37, thus reducing the opportunity for are over. Alternate electrode patterns sufficient to provide a distance suitable to prevent arc over may be employed, as desired, and are considered within the scope of the present invention. Previously, are overs were known to occur at about 5 k VAC rms (voltage alternating current root mean square). The present system eliminates arc overs at least until about 7 k VAC rms.

In constructing a stack of cells to provide a reactor element, plate 24 actually becomes the lower plate of the next cell above that shown. The new cell is, in turn, completed by an uncoated plate 34 laid above plate 24, then a pair of spacers 30 and another grounded conductor plate 36, 1placed on top of the spacers to form the second cell. In this manner, a stack of cells is created having alternate charged and grounded electrode plates to form a reactor element with a plurality of gas passages extending therethrough for exposure of the exhaust passages to the electrically created non-thermal plasma for assisting the reduction of NOx in the exhaust gases.

Figure 4:
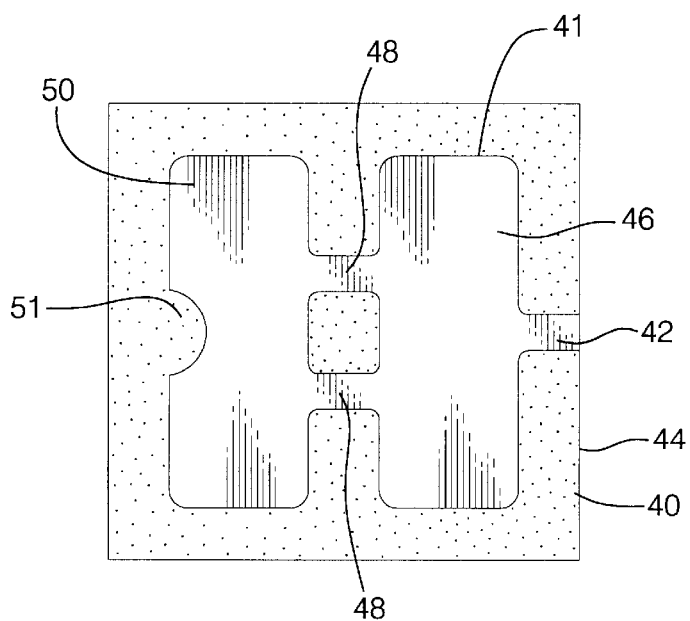
FIG. 4 is a plan view of a single alumina plate having electrodes coated on one surface, in a pattern that spaces the electrode and connector at a distance suitable to prevent arc over, for reaction of NOx in adjacent cells of an improved reactor element.

Referring now to FIG. 4, there is shown another embodiment of alumina plate 40 having painted on the near side thereof a conductor 41. such as silver or platinum. Conductor 41 includes, in series, a connecting section 42 extending to one edge 44 of the plate 40, a first electrode 46 connecting with section 42 and extending longitudinally along a large part of the right hand portion of the plate, intermediate sections 48 extending across the center of the plate at spaced locations and connecting with a second electrode 50 extending longitudinally along a large part of the left hand portion of the plate, and having an inwardly curved hollow 51. Plate 40 is thus comprised of a high dielectric nonporous insulating material, in this case alumina, with a pair of dual large electrodes 46, 50 painted on one surface in a pattern effective to prevent arc over and interconnected through a connecting section 42 with an external conductor, not shown, for electrically connecting the plate to a power source or to ground. The corners of the electrodes are curved and the widths of connecting and intermediate sections are minimized for the reasons discussed with regard to the FIG. 3 embodiment.

Figure 5:
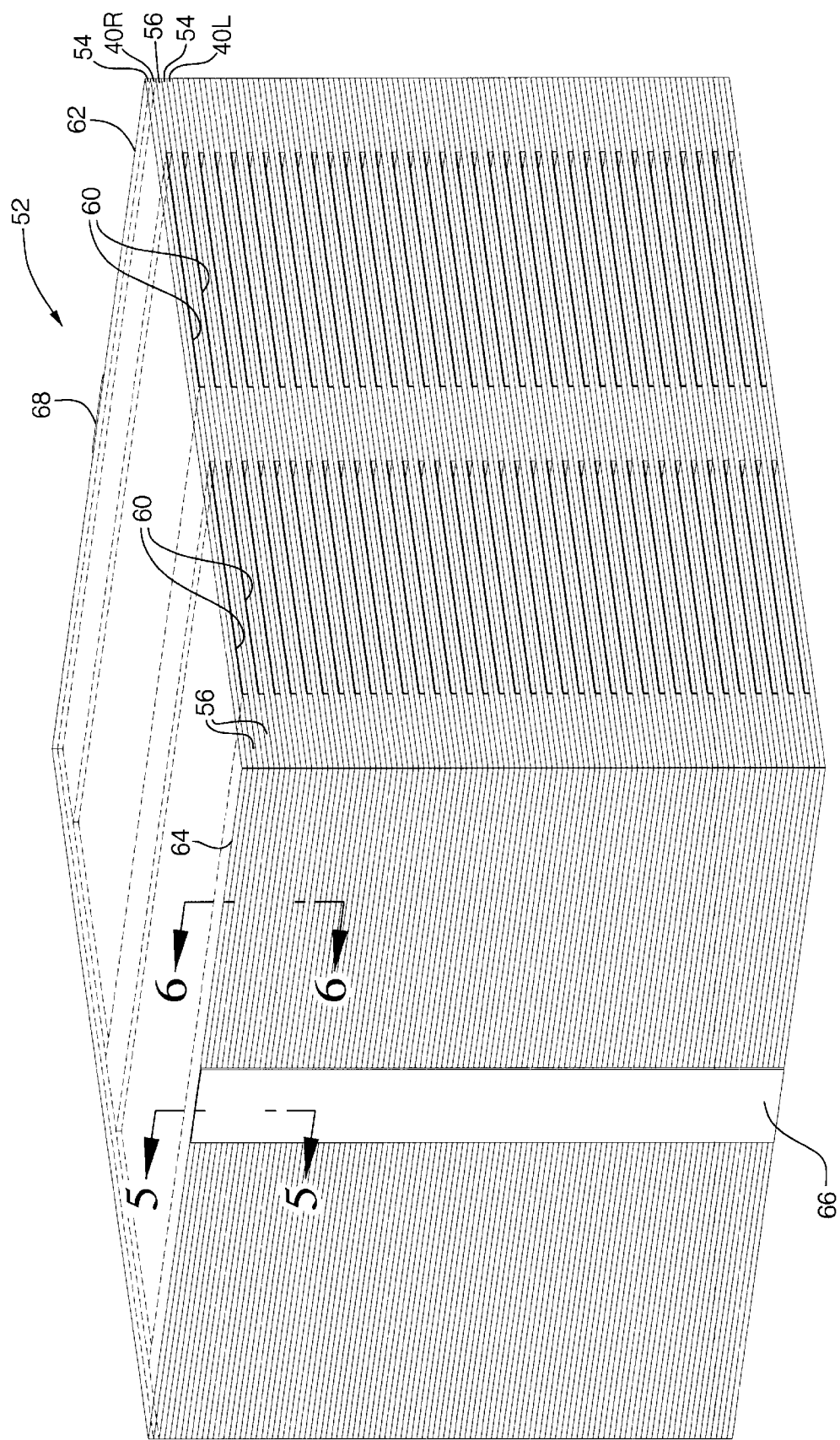
FIG. 5 is a cross-sectional view through an exemplary reactor assembly having a plurality of stacked cells including insulating plates, spacers and electrode carrying plates as shown in FIG. 4.
Figure 6:
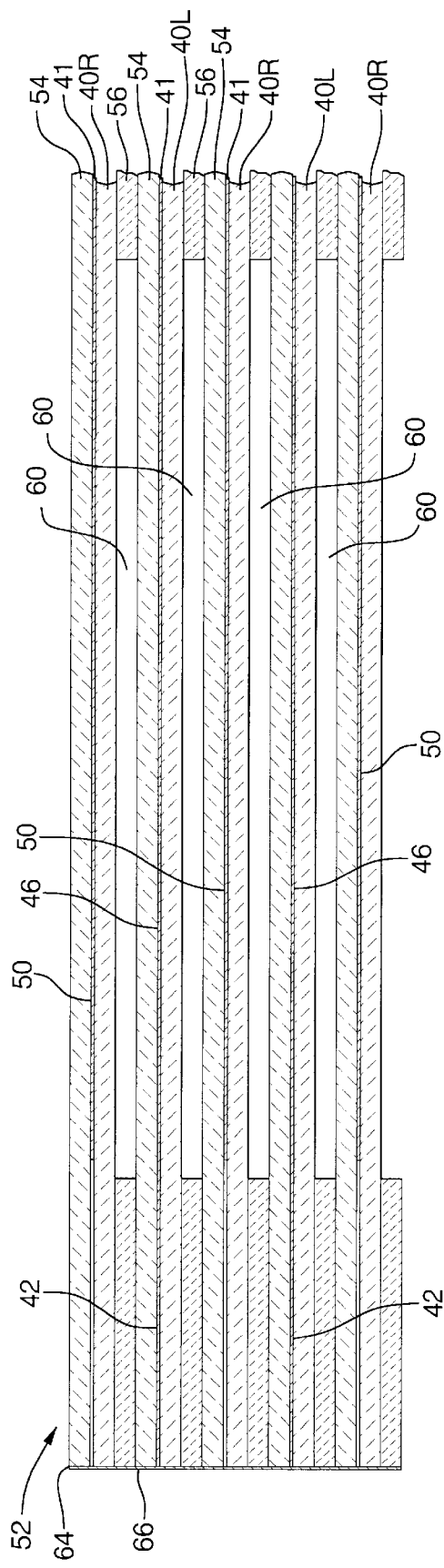
FIG. 6 is a fragmentary cross-sectional view from the plane of the line 5—5 of FIG. 5.
Figure 7:
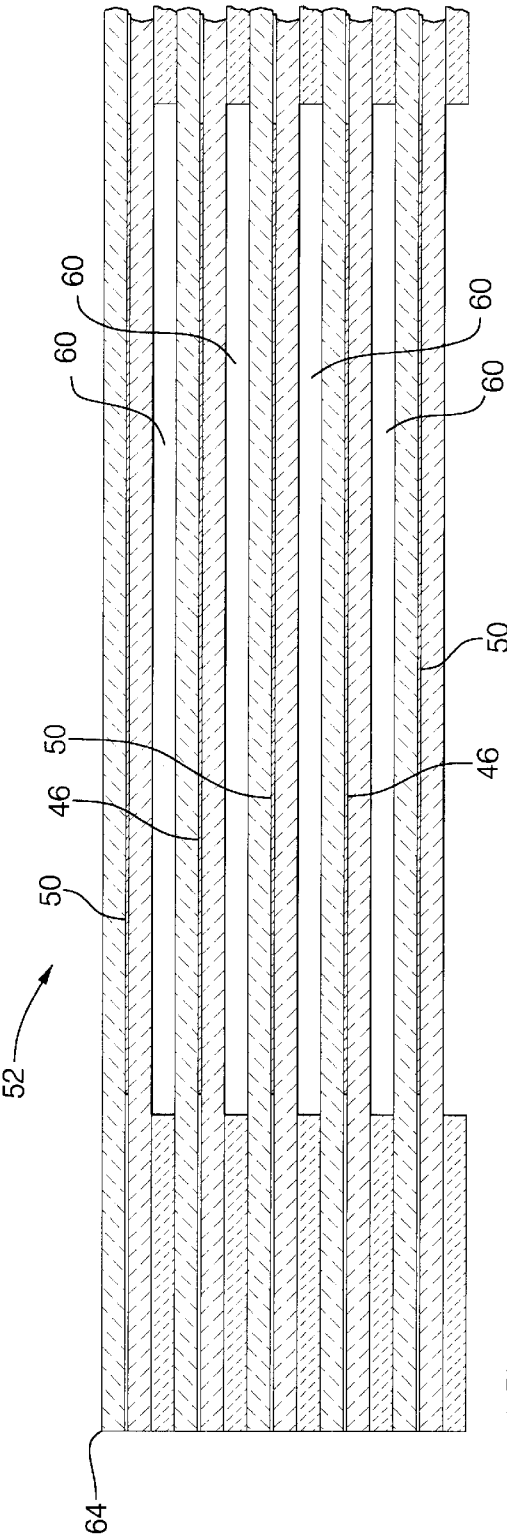
FIG. 7 is a fragmentary cross-sectional view, from the plane of the line 6—6 of FIG. 5.

Referring now to FIGS. 5–7, there is shown a reactor element 52 formed by a stack of dual cells made with electrode plates 40, as well as with plain plates 54 and spacers 56. Note that, as assembled, the reactor cells form dual rows of vertically aligned passages 60, each of which is disposed between a pair of electrodes, of which one is charged with high AC voltage and the other is grounded.

As before, each passage 60 is insulated from the nearest electrode by the thickness of one of the plates, either a plain plate 54 or the thickness of an electrode carrying plate 40 having its electrode painted on the opposite side of the plate from the associated passage. The plates and spacers are stacked in the order of: first, a plain plate 54 on top; second, a charged electrode plate 40R with its conductor 41 on the top of the plate; third, three laterally spaced spacers 56, including two along opposite edges 64, 62 of the plates, and one spacer 56 centered between the other two to separate the passage 60 into two laterally adjacent groups or rows; fourth, another plain plate 54; and fifth, another electrode carrying plate 40L having its conductor 41 painted on the top side of the plate and insulated from the passage above by the plain plate stacked above plate 40L.

As is best illustrated in FIGS. 6 and 7, the plates 40R and 40L are identical except as to the position or orientation of the plates 40R and 40L in the stack of plates making up the reactor element 52. As is apparent from the enlarged cross section of FIG. 6, the plates 40R are positioned so that their conductors 41 connect through sections 42 with the right hand edge 62 (see FIG. 5) of the element 52, while the alternate plates 40L are positioned so that their conductors 41 extend through sections 42 to the left hand edge 64 of the reactor element 52. Thus, the alternate plates 40R, 40L are identical plates 40 that differ only in that they are positioned so that the plates identified as 40R have their connecting sections extending to the right hand edge 62 while the other plates 40L having their connecting sections extending to the left hand edge 64 of the reactor element.

FIGS. 5 and 6 illustrate that the left hand edge 64 of the reactor element includes a vertical conductor 66 which is painted or otherwise applied to the stack of plates making up the reactor element. Conductor 66 extends vertically into electrical contact with the connecting sections 42 of all of the left hand extending plates 40L in the stack. In like manner, a similar vertical conductor 68 is applied along the right hand edge 62 of the reactor element 52 and is in electrical contact with all of the right hand edge extending plates 40R.

From FIGS. 6 and 7, it is observed that the individual electrodes 46, 50 shown in the figures, are generally aligned with the associated passages 60 and extend over a substantial portion of their length, but, except for their points of connection with the outer edges of the reactor element and with the other electrode 46, they do not extend into the areas occupied by the spacers 56. Thus, the pattern of the conductors 41 painted on the various plates makes efficient use of the conductive material by applying it only where needed to form electrodes that energize the various gas passages 60 or to conduct electrical charges to and between the electrodes 46, 50 formed on the plate.

Figure 8:
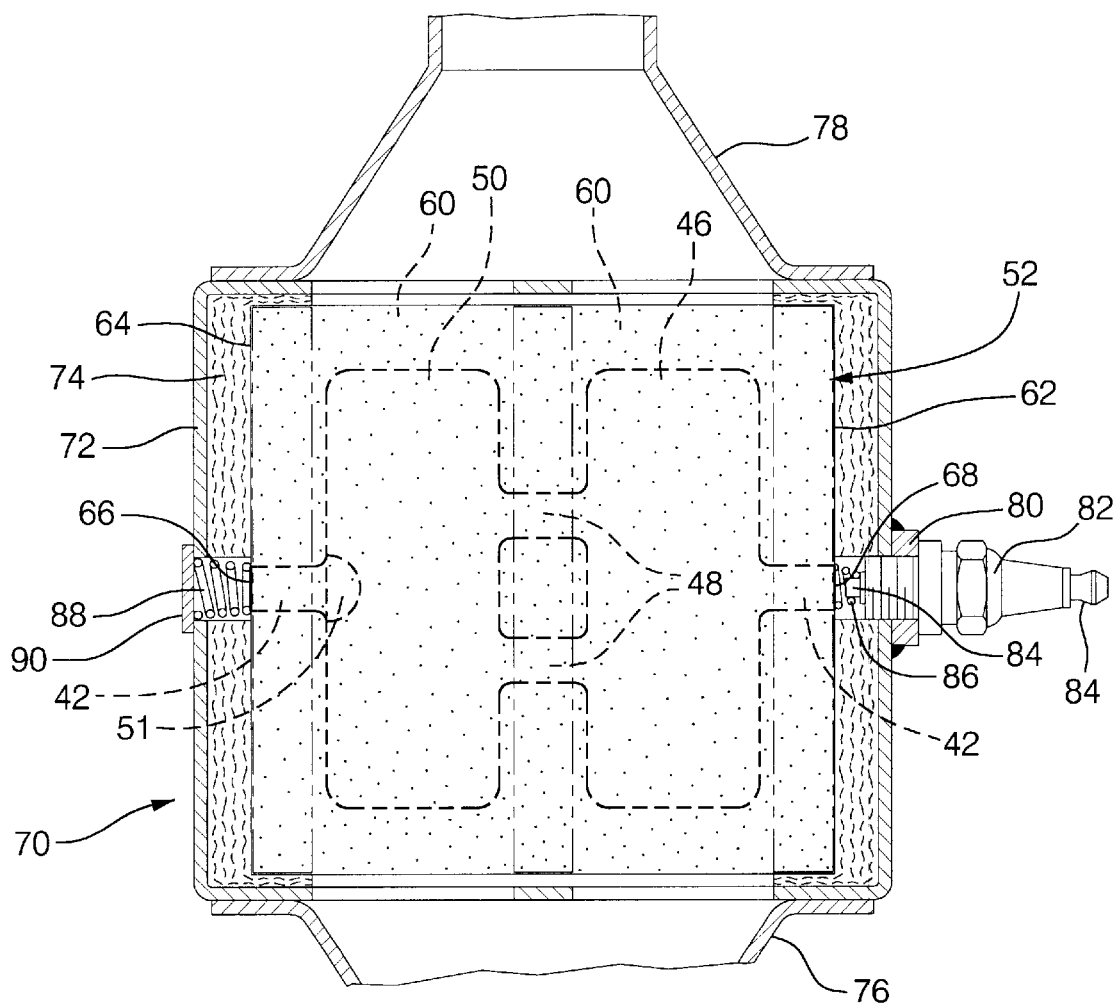
FIG. 8 is a pictorial view of a monolithic reactor element of the type used in the reactor assembly of FIG. 5 and including stacked plates, insulators and spacers.

Referring now to FIG. 8 of the drawings, there is shown a reactor assembly 70 including a high temperature housing 72 enclosing a dielectric mat 74 electrically insulating and forming a shock mount supporting, within the housing, a reactor element 52 as illustrated in FIG. 5. The housing 72 is preferably provided with inlet and outlet cones 76, 78, respectively, for connecting the housing 72 in a vehicle exhaust system and directing the exhaust gases through the passages 60 within the reactor element 52.

To provide the needed high voltage AC power to the plates 40R of the element 52, the housing 72 is provided with a threaded boss 80 in which is mounted an insulated connector 82 having an internal conductor 84 that connects with a spring 86 which in turn contacts the vertical conductor 68 extending vertically along the right hand side or edge 62 of the reactor element 52. Conductor 68 connects through sections 42 of conductors 41 of each plate 40R with the electrodes 46, 50 on each plate. In turn, the alternate plates 40L have their conductors 41 extending through connecting sections 42 into contact with the vertical conductor 66 extending along the left hand side of the reactor element 52. Conductor 66 is engaged by a spring 88 which extends between the conductor 66 and an outer portion 90 of the housing 72 to ground the conductors 41 of plates 40L to the housing, which is in use grounded to the electrical ground of the associated vehicle in which it is installed.

In operation, exhaust flow passes through the reactor assembly 70 from the cone 76 through the internal passages 60 and out through the cone 78 to the following catalytic converter, the operation being as described in connection with the system shown in FIG. 1.

In making a reactor element according to the invention, any suitable materials may be used which have the properties required to carry out the desired functions. The passages through the element and the associated insulating plates are made thin so that the distance between the electrodes above and below each passage are made small. This allows the development of an effective level of non-thermal plasma with voltages reduced to a range that can be provided in a vehicle mounted reactor assembly. The insulating plates must prevent the passage of electric current through the passages which would cause an arc, so material with a high dielectric strength is needed. Thus, high density alumina is preferred, but other insulating materials may also be suitable. Conductive silver or platinum ink baked onto the insulating plates is preferred for conductors and electrodes because it applies as a thin layer and avoids a need for separate wires or connectors. However, other forms of conductors could be used, if desired. The electrodes are coated in a pattern that spaces the electrode and connector at a distance suitable to prevent arc over. The preferred embodiment described herein provides an electrode pattern of generally rectangular shape having an inwardly curved hollow (i.e., notch or cutaway portion) at the end opposite the connector end. Various alternate patterns may of course be employed, if desired, to achieve the present optimum electrode-connector spacing, and are considered within the scope of the present invention. Also, the dielectric mat surrounding the element in a reactor assembly may be of ceramic fiber paper, expandable mica or any suitable material with a high dielectric strength and strength under exhaust reactor gas temperatures.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A non-thermal plasma reactor element comprising a multi-cell stack, individual cells in said stack comprising:

a pair of first and second electrode plates each comprising a high dielectric insulating plate having a printed side and a non-printed side;

said printed side of said electrode plates including an electrode and a connector extending to one edge of said electrode plate, said connector being narrow relative to said electrode;

wherein said electrode plates are oriented such that said connector of said first electrode plate extends to a first edge of said cell and said connector of said second electrode plate extends to a second edge of said cell opposite said first edge, forming alternate ground and charge carrying electrodes;

said electrodes defining a pattern sufficient to establish a separation between said electrodes and connectors of alternate electrodes suitable to inhibit voltage leakage;

a pair of spacers, wherein upper surfaces of said spacers engage said non-printed side of said first electrode plate and lower surfaces of said spacers engage a non-printed high dielectric insulating plate disposed between said pair of spacers and said second electrode plate;

wherein said spacers form an exhaust gas passage between said first electrode plate and said non-printed insulating plate.

2. The element of claim 1, wherein said insulating plates comprise alumina.

3. The element of claim 1, wherein said electrodes have rounded corners.

4. The element of claim 1, wherein said spacers and said insulating plates are configured to be as thin as possible to minimize the distance between said first and second electrode plates while still preventing passage of electric current through said exhaust gas passages.

5. The element of claim 1, wherein a first spacer of said pair of spacers extends along a right edge of said first electrode plate and a second spacer of said pair of spacers extends along an opposite left edge of said first electrode plate.

6. The element of claim 1, further comprising:

a third spacer disposed between said pair of spacers to provide two laterally adjacent groups of vertically aligned exhaust gas passages.

7. The element of claim 1, wherein said printed side of said insulating plates comprises dual electrodes;

said dual electrodes including, in series, a first electrode having a connector extending to one edge of said insulating plate, a second electrode, and at least one intermediate section connecting said first electrode to said second electrode.

8. The element of claim 7, wherein said dual electrodes have rounded corners.

9. The element of claim 7, wherein said at least one intermediate section is narrow relative to said first and second electrodes.

10. The element of claim 7, further comprising:

a third spacer disposed between said pair of spacers to provide two laterally adjacent groups of vertically aligned exhaust gas passages.

11. A non-thermal plasma reactor assembly containing the reactor element as in claim 1 and including:

a high temperature housing surrounding said reactor element and spaced therefrom by a dielectric mat supporting the element in said housing;

an insulated conductor connecting said charge carrying electrodes to an alternating voltage source;

an grounded conductor connecting said ground electrodes to ground; and means for directing exhaust gas through said exhaust gas passages.

12. A reactor element as in claim 1, wherein said electrode pattern comprises an inwardly curved un-printed hollow portion disposed at an edge of said electrode of said first electrode plate opposite said connector of said first electrode plate, whereby said hollow provides a separation between said electrode of said first electrode plate and said connector of said second electrode plate sufficient to prevent arc over without diminishing performance.

* * * * *